(12) United States Patent
Fincher et al.

(10) Patent No.: US 7,219,722 B2
(45) Date of Patent: May 22, 2007

(54) APPARATUS AND METHODS FOR POWERING DOWNHOLE ELECTRICAL DEVICES

(75) Inventors: Roger Fincher, Conroe, TX (US); Larry Watkins, Houston, TX (US); Peter Aronstam, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 376 days.

(21) Appl. No.: 10/819,664

(22) Filed: Apr. 7, 2004

(65) Prior Publication Data

US 2005/0224258 A1 Oct. 13, 2005

(51) Int. Cl.
*E21B 4/04* (2006.01)
(52) U.S. Cl. ..................... 166/65.1; 175/104
(58) Field of Classification Search .......... 175/104, 175/57; 166/65.1, 66.4
See application file for complete search history.

(56) References Cited

U.S. PATENT DOCUMENTS

| | | | | |
|---|---|---|---|---|
| 3,981,745 A | * | 9/1976 | Stedman | 204/266 |
| 4,817,711 A | * | 4/1989 | Jeambey | 166/248 |
| 5,202,194 A | | 4/1993 | VanBerg, Jr. | |
| 5,316,869 A | * | 5/1994 | Perry et al. | 429/19 |
| 5,661,977 A | * | 9/1997 | Shnell | 60/641.2 |
| 6,575,248 B2 | | 6/2003 | Zhang et al. | |
| 6,585,045 B2 | * | 7/2003 | Lee et al. | 166/252.5 |
| 6,684,948 B1 | * | 2/2004 | Savage | 166/248 |
| 6,686,079 B2 | | 2/2004 | Zhang et al. | |
| 7,055,627 B2 | * | 6/2006 | Fontana et al. | 175/65 |
| 7,096,953 B2 | * | 8/2006 | de Rouffignac et al. | 166/302 |
| 2006/0006656 A1 | * | 1/2006 | Smedstad | 290/43 |

* cited by examiner

*Primary Examiner*—David Bagnell
*Assistant Examiner*—Daniel P Stephenson
(74) *Attorney, Agent, or Firm*—Madan, Mossman & Sriram, P.C.

(57) ABSTRACT

A drilling system comprises a tubular member disposed in a wellbore having a downhole assembly disposed therein. At least one electrical device is disposed in the downhole assembly. A fuel cell is disposed in the downhole assembly and operatively coupled to the electrical device for providing electrical power thereto. The fuel cell extracts at least a portion of its fuel supply from the flowing drilling fluid downhole. In another aspect, a pipeline system comprises a pipeline having a fluid flowing therein. An electrically powered device is disposed in the pipeline. A fuel cell is operatively coupled to the electrically powered device for providing electrical power thereto. The fuel cell extracts at least a portion of a fuel supply from a fluid flowing in the pipeline.

22 Claims, 7 Drawing Sheets

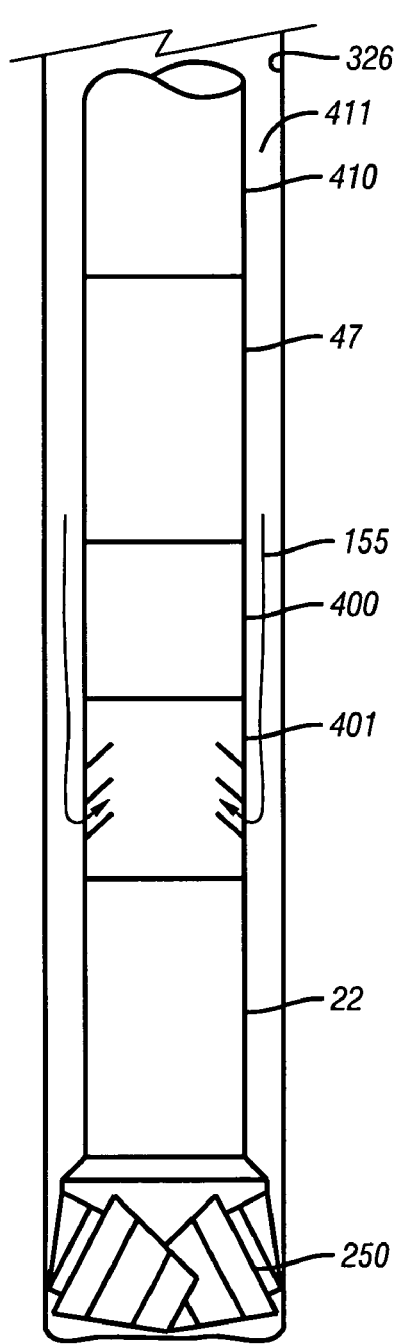
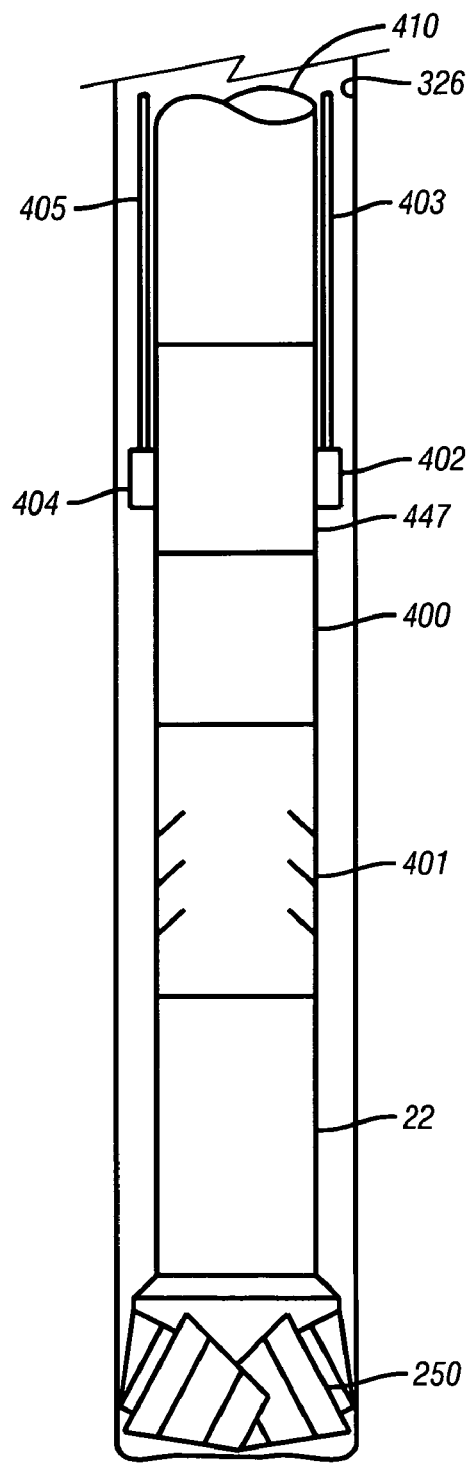
FIG. 5
FIG. 6

APPARATUS AND METHODS FOR POWERING DOWNHOLE ELECTRICAL DEVICES

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

This invention relates to powering downhole electrical devices, and more particularly, to fuel cells that are adapted for downhole use in wells.

2. Description of the Related Art

More and larger electrical devices are being proposed for downhole applications. These include, for example, the use of electric motors for driving the drill bit and for driving downhole pumps for forward or reverse circulation of the drilling fluid. In large hole applications, such devices could be on the order of several hundred horsepower, with multiple devices used in the same downhole application. It is difficult, however, to transmit large amounts of power downhole for drilling purposes. In the static conditions associated with production environments, cables may be strapped to a production tubular, but even these hamper the initial deployment of the production string and more severely impact efficient workover operations. At high power levels, the size constraints placed on the cable size in the downhole environment leads to unacceptable power losses in the cable.

Other systems, such as wired drill pipe, suffer the same cable size constraints and are like wise unsuitable for transmitting large amounts of power downhole. In addition, such systems require complex surface connections, such as slip rings, with voltage levels that will cause considerable safety concerns. For wired drill pipe, literally hundreds of connections requiring multiple make/break cycles during the drilling of a well raises serious reliability concerns.

Batteries can be used as a local source of power for downhole electrical devices, but are subject to their own problems. For example, increasing the power and energy generation capacity of a battery generally requires a proportionate increase in the size of the battery, which can present difficulties given the space constraints that exist in wellbores. Also, batteries will typically need to be electrically recharged or replaced at some point.

Fuel cells make use of an electrochemical reaction involving a fuel and an oxidant in a cell that comprises an anode, cathode, and electrolyte, to generate electricity without also generating the unwanted by-products associated with combustion, while providing relatively higher energy efficiency. Thus, fuel cells potentially have a number of advantages over other power generation or storage means in many applications. A number of obstacles have hindered the use of fuel cells in high power and/or long term downhole applications. For instance, fuel cells typically provide reservoirs for the necessary fuel and oxidant, which without replenishment, limit the overall run time. Additionally, the reaction product, typically water, needs to be removed from the fuel cell stack in order to continuously run the fuel cell. Removal of the water downhole presents a challenge because the surrounding pressure is commonly higher than that present in a conventional fuel cell placed at surface in an ambient environment and operating in air. Using a pump to expel the water into the high pressure downhole environment may require a large amount of power.

VanBerg U.S. Pat. No. 5,202,194 describes a power supply for providing electricity to electrical circuits located downhole in a well. The power supply comprises a fuel cell, which is fed by hydrogen from a pressure container and oxygen from compressed oxygen gas bottles. Pressure regulators are located in the line between the hydrogen container and the fuel cell, and in the line between the oxygen bottles and the fuel cell. A pump is used to eject water from the fuel cell into the wellbore. The downhole deployment time is limited by the fuel and oxygen supply volumes.

There is a need for a downhole fuel cell that can provide substantial amounts of power over long durations.

SUMMARY OF THE INVENTION

In one aspect of the present invention, a drilling system comprises a tubular member disposed in a wellbore having a downhole assembly disposed at a bottom end thereof. At least one electrical device is disposed in the downhole assembly. A fuel cell is disposed in the downhole assembly and operatively coupled to the electrical device for providing electrical power thereto. The fuel cell extracts at least a portion of its fuel supply from the flowing drilling fluid downhole.

In another aspect, a pipeline system comprises a pipeline having a fluid flowing therein. An electrically powered device is disposed in the pipeline. A fuel cell is operatively coupled to the electrically powered device for providing electrical power thereto. The fuel cell extracts at least a portion of a fuel supply from a fluid flowing in the pipeline.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein:

FIG. 5 is a schematic drawing of a fuel cell powered reverse circulation downhole assembly according to one embodiment of the present invention;

FIG. 6 is a schematic drawing of a fuel cell powered downhole assembly having fuel and oxidizer supplied through capillary lines according to one embodiment of the present invention;

DESCRIPTION OF PREFERRED EMBODIMENTS

Figure 1:
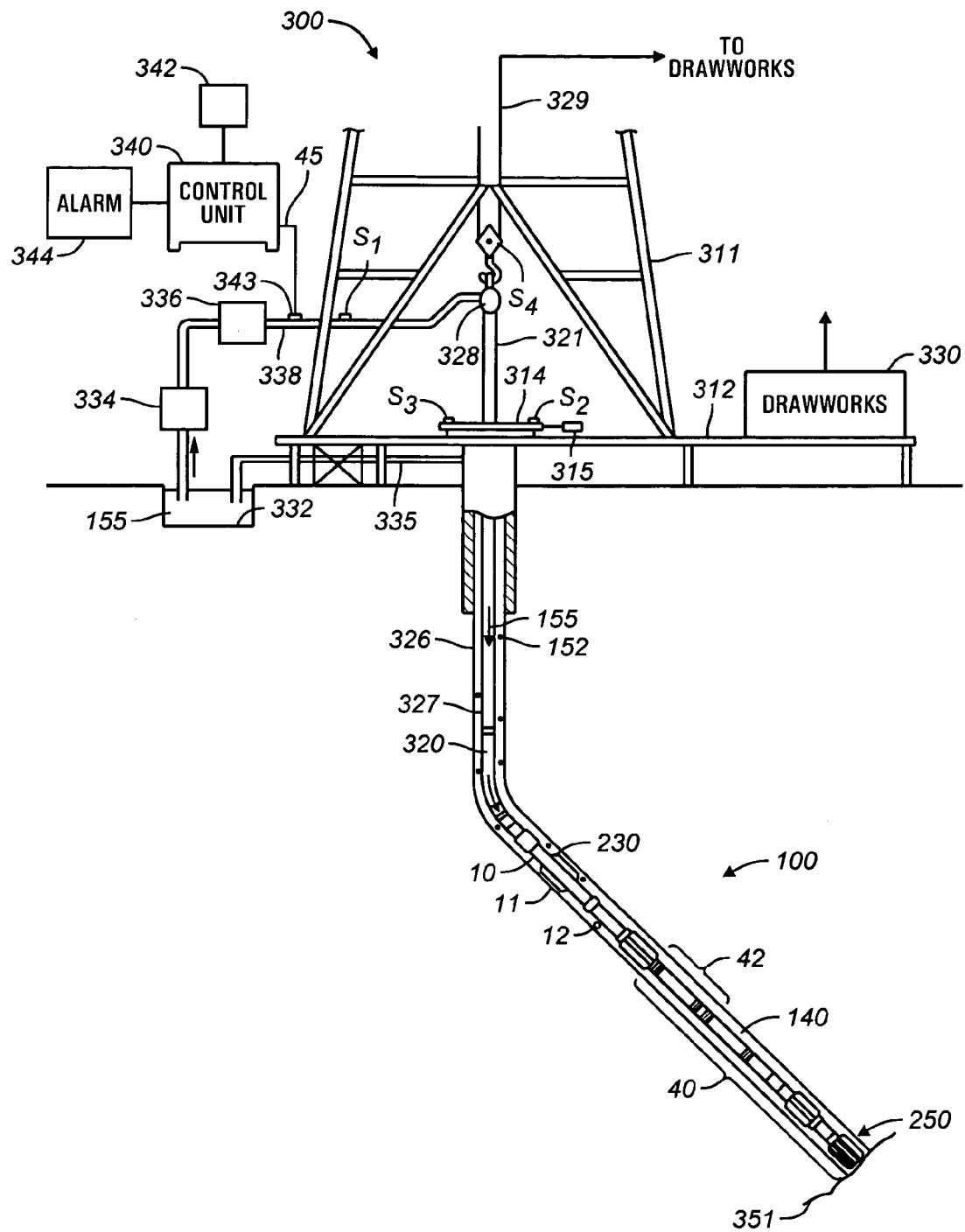
FIG. 1 is a schematic drawing of a drilling system according to one embodiment of the present invention.

FIG. 1 shows an embodiment of a land-based drilling system utilizing a downhole assembly 100 made according to the present invention to drill wellbores. The concepts and methods for use described herein are equally applicable to offshore drilling systems or systems utilizing different types of rigs. The system 300 shown in FIG. 1 has a downhole assembly 100 conveyed in a borehole 326. The drilling system 300 includes a derrick 311 erected on a floor 312 that supports a rotary table 314 which is rotated by a prime mover such as an electric motor 315 at a desired rotational speed. The drill string 320 includes the drill pipe 152 extending downward from the rotary table 314 into the borehole 326 with downhole assembly 100 attached to the bottom of the drill pipe 152. Drill bit 250 is attached to the bottom of downhole assembly 100 and disintegrates the geological formations when it is rotated to drill the borehole 326. The drill string 320 is coupled to a drawworks 330 via a kelly joint 321, swivel 328 and line 329 through a pulley (not shown). During the drilling operation the drawworks 330 is operated to control the weight on bit, which is an important parameter that affects the rate of penetration. The operation of the drawworks 330 is well known in the art and is thus not described in detail herein. It will be appreciated by one skilled in the art, that downhole assembly 100 may be alternatively conveyed into borehole 326 by a coiled tubing system(not shown). Coiled tubing systems are known in the art and are not described here.

During drilling operations, in one embodiment, a suitable drilling fluid 155 from a mud pit (source) 332 is circulated under pressure through the drill string 320 by a mud pump 334. In common operation, the drilling fluid 155 passes from the mud pump 334 into the drill string 320 via a desurger 336, fluid line 338 and the kelly joint 321. The drilling fluid 155 is discharged at the borehole bottom 351 through an opening in the drill bit 150. The drilling fluid 155 circulates uphole through the annular space 327 between the drill string 320 and the borehole 326 and returns to the mud pit 332 via a return line 335. A sensor $S_1$ preferably placed in the line 338 provides information about the fluid flow rate. A surface torque sensor $S_2$ and a sensor $S_3$ associated with the drill string 320 respectively provide information about the torque and the rotational speed of the drill string. Additionally, a sensor $S_4$ associated with line 329 is used to provide the hook load of the drill string 320.

Downhole assembly 100 includes large diameter tubular sections 10, commonly referred to as drill collars, used in conjunction with drawworks 330 to control the weight on bit 250. In the present system, the drill bit 250 may be rotated by only rotating motor 140 or the rotation of the drill pipe 152 may be superimposed on the motor rotation. The rate of penetration (ROP) of the drill bit 250 into the borehole 326 for a given formation and a downhole assembly largely depends upon the weight on bit and the drill bit rpm. Downhole assembly 100 may also contain a measurement while drilling (MWD), also called logging while drilling, system 12 that contains multiple sensors (not shown) for determining downhole parameters of interest. Such sensors measure parameters related to borehole direction, formation properties, drilling dynamic properties and drilling fluid properties. Downhole assembly 100 includes a power/drive assembly 40 that comprises a power source 42 providing power to drive motor 140 that is connected to and rotates bit 250.

A surface controller 340 receives signals from the MWD system 12 related to the downhole parameters via a sensor 343 placed in the fluid line 338 and signals from sensors $S_1$, $S_2$, $S_3$, hook load sensor $S_4$ and any other sensors used in the system and processes such signals according to programmed instructions provided to the surface controller 340. The surface controller 340 displays desired drilling parameters and other information on a display/monitor 342 and is utilized by an operator to control the drilling operations. The surface controller 340 contains a computer, memory for storing data, recorder for recording data and other peripherals. The surface controller 340 processes data according to programmed instructions and responds to user commands entered through a suitable device, such as a keyboard or a touch screen. The controller 340 is preferably adapted to activate alarms 344 when certain unsafe or undesirable operating conditions occur.

Figure 2:
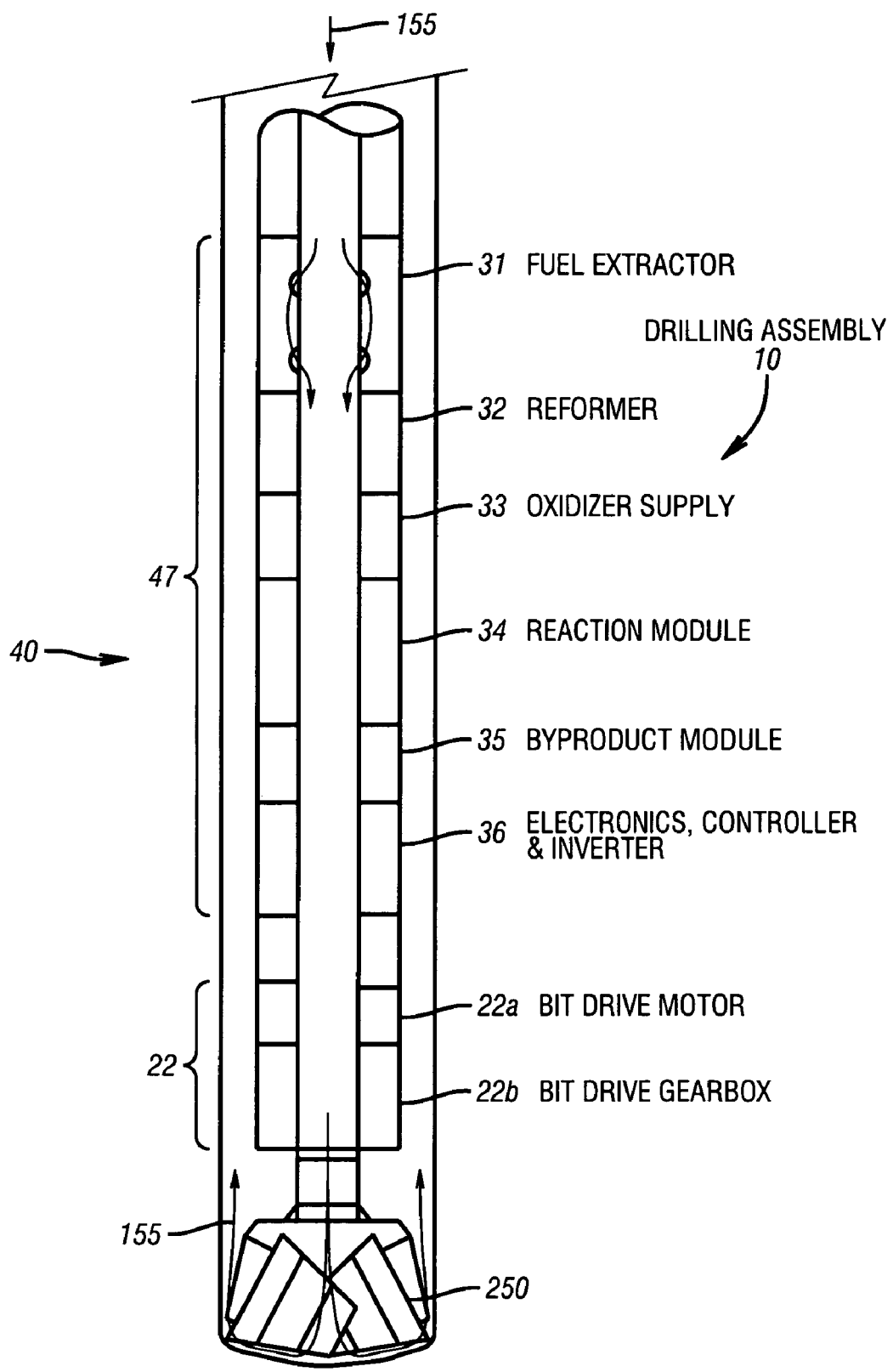
FIG. 2 is a schematic drawing of assembly having a fuel cell disposed therein according to one embodiment of the present invention.

FIG. 2 shows power/drive assembly 40 according to one embodiment of the to present invention, having a fuel cell 47 supplying power to an electric motor drive 22 for rotating bit 250. Fuel cell 47 extracts the fuel, a hydrocarbon from which hydrogen is stripped out, from the drilling fluid 155 as the drilling fluid 155 flows past the fuel extraction module 31. Drilling fluid 155 may be an oil base drilling fluid that commonly consists of a diesel fuel base to which other components of the drilling fluid, such as weighting material, are added. Fuel extraction module 31 can be located at any suitable position in power/drive assembly 40 and can comprise a semi-permeable membrane through which a hydrocarbon liquid, such as the diesel fuel, may pass. A portion of the diesel fluid passes through the semi-permeable membrane as the fluid flows by the fuel extraction module 31. Alternatively, a portion of the drilling fluid may be diverted through the fuel extraction module for bringing the hydrocarbon fluid in contact with the semi-permeable membrane. Alternatively, fuel extraction module 31 may be adapted to extract fuel from the return fluid as it returns to the surface through the annulus 327. The return fluid may contain the diesel based drilling fluid 155 as well as hydrocarbon fluids produced from the formation surrounding borehole 326.

For water base drilling fluid, a hydrocarbon fluid may be added to the water base to form an immiscible mixture with the water being the continuous fluid phase. The semi-permeable membrane in fuel extraction module 31 passes the hydrocarbon in the drilling fluid and uses the extracted hydrocarbon as fuel for the rest of the process described below. Alternatively, hydrocarbons produced from the drilled formations may form an immiscible mixture with the water being the continuous phase. As described above, the semi-permeable membrane in fuel extraction module 31 passes the hydrocarbon in the drilling fluid and uses the extracted hydrocarbon as fuel for the rest of the process described below. Alternatively, in a producing wellbore, the produced fluid has a substantially high portion of hydrocarbon fluid, of which a portion may be stripped out in extraction module 31.

The hydrogen is stripped from the from the hydrocarbon fluid in the reformer module 32. Reformers for removing hydrogen from hydrocarbons for use in fuel cells are known in the art and are not discussed in detail here. Hydrogen from the reformer module 32 is fed to a reaction module 34 by internal flow conduits (not shown).

Likewise, oxygen from an oxidizer supply module 33 is fed to reaction module 34. In one embodiment, oxidizer supply module has storage tanks, not shown, that have sufficient oxygen storage capacity for the fuel cell process. Alternatively, oxygen is inserted into the drilling fluid flow for extraction downhole in the oxidizer supply module. In one embodiment, oxygen may be contained in microspheres having suitable pressure integrity to withstand the downhole pressure. A portion of the drilling fluid may be diverted through the oxidizer supply module 33 and the microspheres separated out by a suitable screen. The microspheres may be crushed to release the oxygen. The oxygen may be allowed to flow across a semi-permeable membrane for use in the fuel cell process. In one embodiment, both hydrogen and oxygen are supplied in separate microspheres that are separately captured downhole, for example by differing sizes in the reformer module 32 and in the oxidizer module 33. The released hydrogen and released oxygen are fed to the reaction module 34 for producing electricity.

Figure 3:
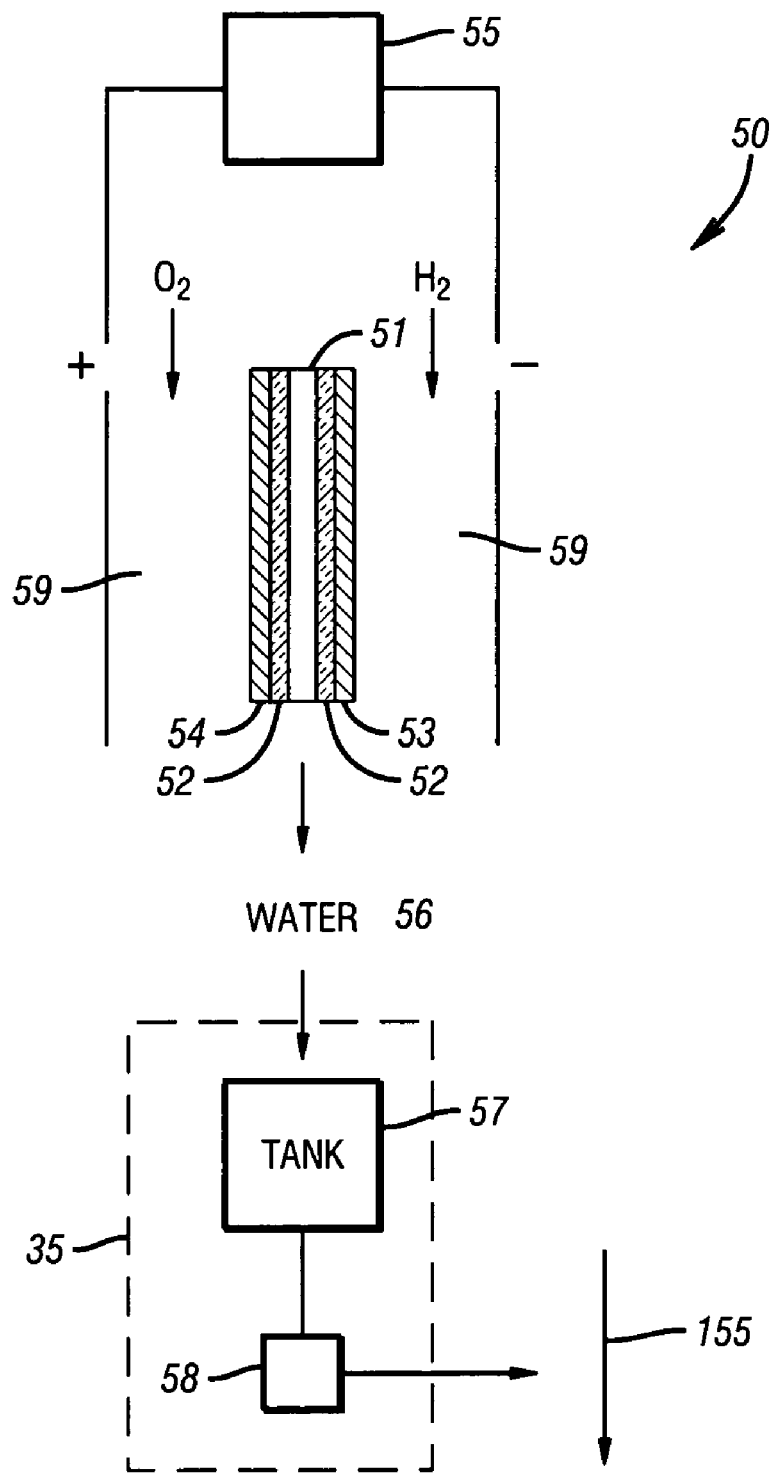
FIG. 3 is a schematic of a portion of a fuel cell system according to one embodiment of the present invention.

In one embodiment, reaction module 34 contains a proton exchange membrane (PEM) reaction cell 50, see FIG. 3. At the anode 53 the hydrogen molecules give up electrons and form hydrogen ions, a process which is made possible by a platinum catalyst 52. The electrons travel to the cathode 54 through an external circuit 55, producing electrical current. This current can perform useful work by powering any electrical device (such as an electric motor). The proton exchange membrane 51 allows protons to flow through, but stops electrons from passing through it. As a result, while the electrons flow through an external circuit, the hydrogen ions flow directly through the proton exchange membrane to the cathode, where they combine with oxygen molecules and the electrons to form water 56. The proton exchange membrane 51 may be a thin polymer sheet that allows hydrogen ions to pass through it. The membrane is coated on both sides with highly dispersed metal alloy particles (typically platinum) that are active catalysts. The electrolyte 59 used may be a solid organic polymer such as poly-perflourosulfonic acid. Such a fuel cell develops an electromotive potential on the order of 0.7 volt. Therefore, multiple cells are commonly stacked in the reaction module 34 and connected in series to provide sufficient voltage to operate the desired downhole equipment. In the embodiment of FIG. 2, the cells are arranged in an annular fashion that can include multiple stacked cells. Valves (not shown) may be operated by controller module 36 to control the flow of fuel and oxidizer to control the power generation.

In the PEM reaction cell 50 described above, water 56 is generated as a byproduct of the chemical reaction and is passed to byproduct module 35. Byproduct module 35 may contain a storage container for storing the byproduct. Alternatively, byproduct module 35 may contain a pump 58 for pumping the byproduct water into the drilling fluid 155.

Figure 4:
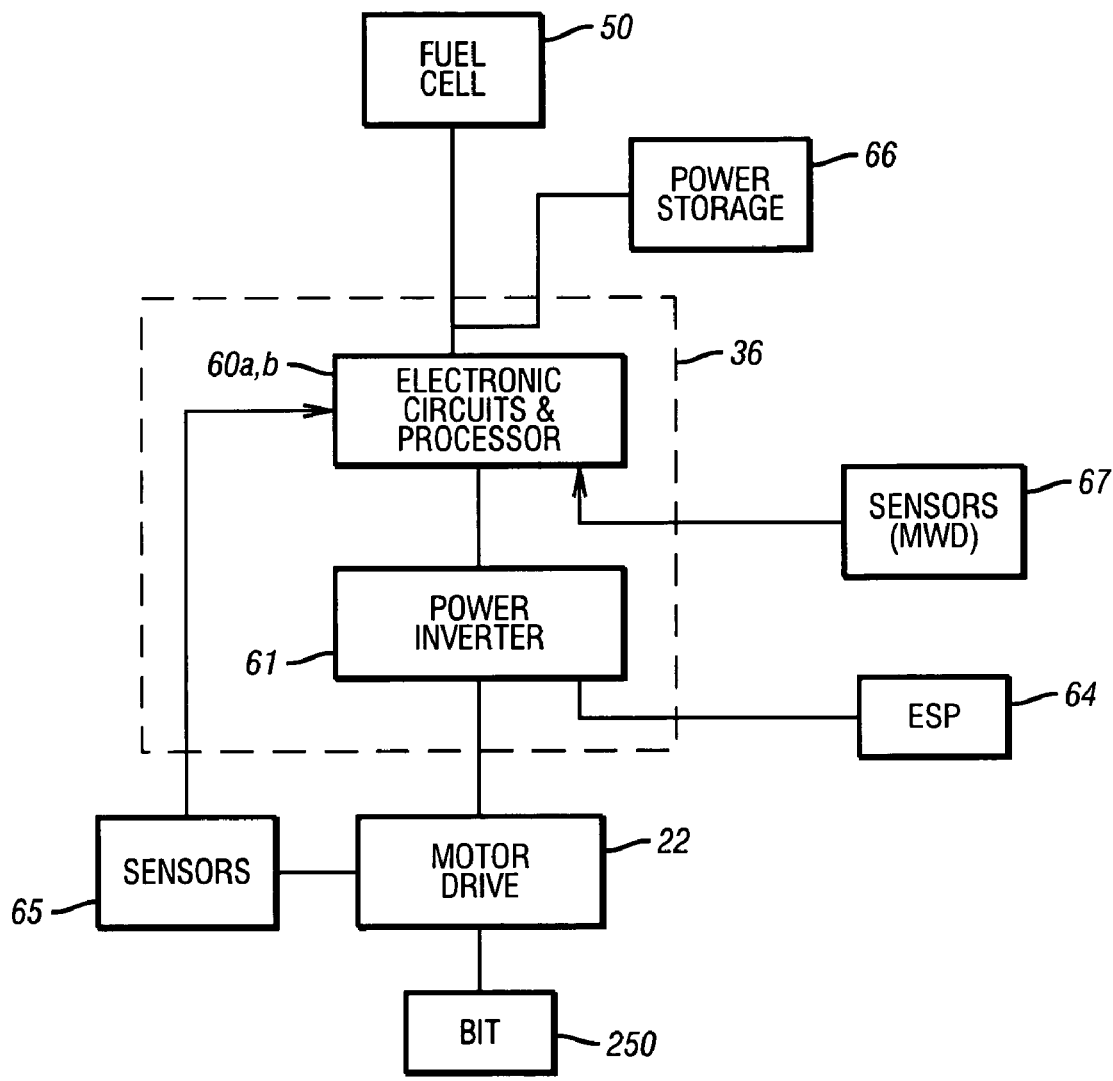
FIG. 4 is a block diagram showing the interrelationship of the downhole components according to one embodiment of the present invention.

Power from PEM reaction cell 50 is controlled by a controller module 36, see FIGS. 2 and 4, that contains electronic circuits and a processor, with memory, to interface the output from the fuel cells to the appropriate downhole electrical device. Controller module 36 may also contain an inverter to convert direct current (DC) to alternating current (AC) as required. For example, motor drive 22 may include a DC or, alternatively, an AC motor for rotating bit 250. The type of motor will typically be determined by the selection of the motor size and the associated control circuits for the motor. Criteria are known in the art for selecting the appropriate type of motor and control circuits without undue experimentation. Motor drive 22 may include a drive motor 22a and a gear box 22b for providing appropriate rotational speed and toque to bit 250. Alternatively, controller 36 may continuously control the speed and torque of motor 22a such that a gear box 22b is not required. Sensors 65 measure operating parameters of motor drive 22 and provide these measurements to circuits 60 in controller module 36 that provide overload control and/or operating status of motor drive 22.

Controller module 36 may also include electrical storage capacity such as batteries and/or capacitors to provide surge load capacity. Circuits 60a and processor 60b may also receive sensor signals from sensors 67 associated with MWD system 12 for providing information regarding parameters associated with the formation, the wellbore direction, and the drilling dynamics of the downhole assembly 100. These data may be used by programs in processor 60b to control the operation of motor drive 22.

In another embodiment, see FIG. 5, a reverse circulation system includes downhole assembly 410 that has drilling fluid 155 flowing from the surface down the annular space 411 between downhole assembly 410 and borehole 326. At least a portion of the flow of drilling fluid 155 is diverted through flow diverter 401 into the bore (not shown) of downhole assembly 410. Fuel cell 47 powers electric submersible pump (ESP) 400 that takes suction from the diverted flow and provides flow energy to pump the drilling fluid 155 back up the bore of the downhole assembly 410 and drill pipe (not shown) to the surface equipment as described in relation to FIG. 2. An advantage of such a reverse circulation system is that very little flow energy is required to pump the drilling fluid down the annulus. The major portion of the flow energy is provided at ESP 400 for overcoming frictional losses in the return flow path to the surface inside the downhole assembly 410 and the drill pipe. The bottom of the borehole is not exposed to the high pressures normally experienced due to the drilling fluid flow in conventional forward flowing systems. One of the major functions of the drilling fluid 155 flow is to remove cuttings from the bit area as the bit 250 disintegrates the formation. Normal fluid velocities of 150–200 feet per minute are used to support the cuttings in the drilling fluid 155. The flow rate required to maintain these fluid velocities in common forward flow systems is determined by the annular space in the region extending along the drill pipe. High flow rates are required to provide the desired velocities in this region. However, this flow must also pass through the smaller annular space between the downhole assembly and the borehole. The pressure drop in this smaller annular region is a major portion of the pressure required at the bit in a forward flow system and can be substantial enough so as to cause fracturing of the formation. The reverse circulation system allows the high pressure needed to lift the cutting to be confined inside the downhole assembly and drill pipe thereby allowing better control of the bottom hole drilling fluid pressure. In addition, because the drilling fluid, in the reverse circulation system, is traveling up a much smaller diameter, the drilling fluid flow rate needed to lift the cuttings is substantially smaller than in the forward circulation system. Fuel cell 47 also provides power to drive module 22 for rotating bit 250. For additional details regarding reverse circulation systems, see U.S. Provisional Application Ser. No. 60/428,423 filed on Nov. 22, 2002, and incorporated herein by reference.

In another embodiment, see FIG. 6, fuel supply line 403 and oxidizer supply line 405 run from the surface along the drill pipe (not shown) and downhole assembly 410 and connect to fuel cell 447 through bulkheads 402 and 404, respectively. Alternatively, coiled tubing may be used to convey the downhole assembly into wellbore 326. In that case, fuel supply line 403 and oxidizer supply line 405 may be run along the outside of the coiled tubing or may be run along the inside of the coiled tubing. While shown in FIG.

6 as individual lines, lines 403 and 405 may be contained in a single umbilical bundle of a type known in the art. Alternatively, lines 403 and 405 may be run inside the drill pipe (not shown) and downhole assembly 410 using techniques known in the art.

Figure 7:
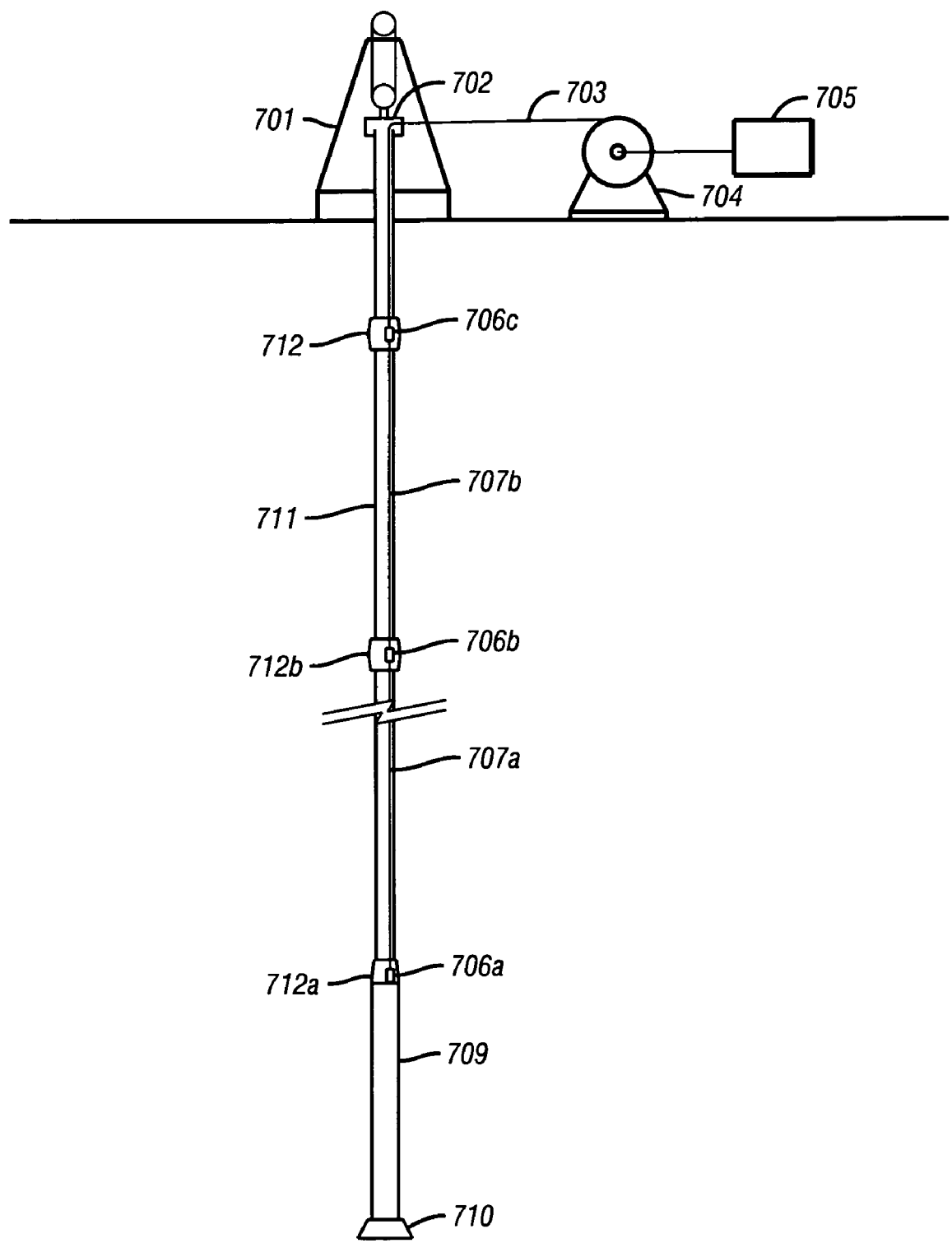
FIG. 7 is a schematic drawing of a fuel cell powered downhole assembly having fuel and oxidizer supplied through capillary lines according to one embodiment of the present invention.

In one embodiment, see FIG. 7, fuel and oxidizer supply lines are run inside of the drill string 711 and are coupled to the downhole assembly 709 through a wet connector 706a in connector sub 712a. The fuel and oxidizer are routed to a fuel cell (not shown) in the downhole assembly 709. In the embodiment shown in FIG. 7, a top drive 702, of a kind known in the art, is supported in derrick 701 and adapted to pass umbilical 703 into the flow passage of drill string 711 and stab into a wet connector such as connectors 706a–c. Top drive 702 is used to rotate drill string 711. Drill bit 710 may be rotated by top drive 702 and/or by a drilling motor (not shown) in the downhole assembly 709. Stabbed wet connectors for electrical and/or fluid connections are known in the art and are not described here. Umbilical 703 is fed into the drill string 711 from reel 704 that is connected to a fuel and oxidizer supply system 705.

In drilling operation the umbilical must be retracted and reinserted at each drill joint connection. To reduce the extraction and insertion time, umbilical 703 is limited to a predetermined length on the order of 1000–3000 feet. When the drill string exceeds the predetermined length, umbilical 707a is installed from connector sub 706a to connector sub 706b inserted in drill string 711. Umbilical 703 is then run to connector 706b until the drill string length between connector sub 706b and the surface exceeds the predetermined length. Umbilical 707b is installed between connector sub 706b and connector sub 706c. Additional lengths of umbilical 707 may be added, as required, to reach the desired drill string length. Alternatively, a coiled tubing may be used for drill string 711 and a continuous umbilical may be placed inside the coiled tubing using techniques known in the art.

Figure 8:
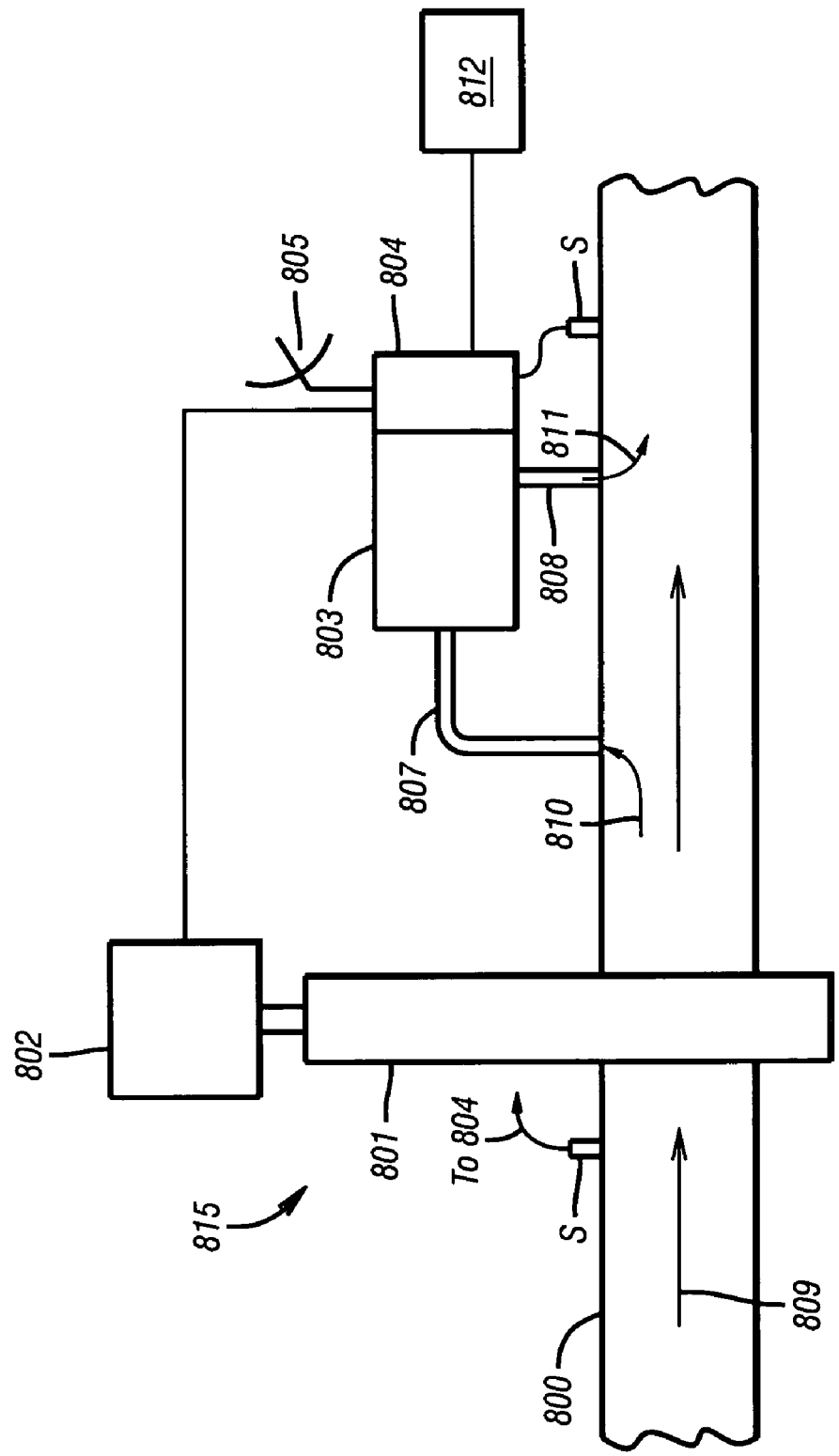
FIG. 8 is a schematic drawing of a fuel cell powered pipeline valve according to one embodiment of the present invention.

In FIG. 8, a pipeline 800 has a valve assembly 815 inserted in the pipeline to control fluid flow 809, commonly a hydrocarbon fluid. Valve assembly 815 comprises a valve 801 and an actuator 802. Common actuators may be electrically, hydraulically, or pneumatically powered. Hydraulic and pneumatic systems commonly use flow line pressure to hold the valves in position, typically open. If line pressure is lost, the valve closes and blocks flow. Valve leaks compromise the proper action of such valves. In addition, pressure controlled valves require a buildup of pressure to operate properly. During flow startup, this causes added complexity to be designed into the valve systems to handle the startup transients. Electrically powered actuators commonly provide better control and are more easily adapted to remote control. Pipelines, however, may run tens or hundreds of kilometers. As such, it is logistically difficult and expensive to run and maintain power lines to operate such valves. Solar arrays have been used but have difficulty providing adequate power in areas of reduced solar input, such as, for example, (i) at high latitudes; (ii) in forested or jungle areas; and/or. (iii) in other substantially shade locations. The power available from such arrays is highly dependent on having a substantially clear sky, even with battery storage capacity. The high power demands required to actuate large valves make such solar systems unreliable.

In one embodiment of the present invention in FIG. 8, a fuel cell 803 and reformer (not shown), similar in concept to those described previously, are connected to actuator 802 to provide power to operate valve 801. Fuel cell 803 is connected by line 807 to pipeline 800. A portion 810 of hydrocarbon flow 809 is passed through line 807 through the reformer and used as fuel by fuel cell 803. Fuel cell 803 may have internal storage of an oxidizer used to combine with the fuel from flow 809 to generate electricity for powering actuator 802. Alternatively, the oxidizer may be drawn from the local atmospheric air. In another alternative, the oxidizer may be contained in external tanks (not shown) connected to fuel cell 803. The byproducts 811 of the fuel cell reaction (predominately water) are fed back into the flow line through line 808. A pump (not shown) may be used to pump the byproducts 811 into line 800. Alternatively, the byproducts 811 (if water) may be allowed to drain to the local ground area.

Controller 804 is connected, at least electrically, to fuel cell 803 and controls, according to programmed instructions, the operation of fuel cell 803. Controller 804 has circuits to convert and control the electric power generated by fuel cell 803. External batteries 812 may be used to provide backup storage and/or high drain capacity. Controller 804 has circuits for controlling and reading sensors S for determining parameters related to the fluid flow, pipeline integrity, and actuator 802 and valve 801 status. Controller 804 may also contain a processor having memory storage for storing operating instructions and storing data from such sensors. Controller 804 may have RF telemetry capability for transmitting data to, and/or receiving instructions from, remote stations. Multiple valve assemblies 815 may be disposed along pipeline 800. The fuel cell 803 may also be used to power other electrical devices commonly disposed along pipeline 800 including, but not limited to, (i) filter dump valves, (ii) drain valves, (iii) sensor devices, and (iv) sensor telemetry stations.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

What is claimed is:

1. A drilling system, comprising:
   a. a tubular member disposed in a wellbore having a downhole assembly attached at a bottom end thereof;
   b. an electrical device disposed in said downhole assembly; and
   c. a fuel cell disposed in said downhole assembly and operatively coupled to said electrical device for providing electrical power thereto; and
   d. an extractor associated with the fuel cell extracting at least a portion of a fuel from a fluid flowing in said wellbore.

2. The drilling system of claim 1, wherein said extractor further extracts at least a portion of an oxidizer from said flowing fluid.

3. The drilling system of claim 1, wherein the electrical device is a motor driven pump.

4. The drilling system of claim 1, wherein the electrical device is a motor disposed in the downhole assembly for driving a drill bit.

5. The drilling system of claim 1, wherein the fuel cell comprises:
   i. a fuel source for supplying a hydrocarbon fuel;
   ii. a reformer for extracting hydrogen from said hydrocarbon fuel;
   iii. an oxidizer source for supplying oxygen; and
   iv. a reaction device for combining said hydrogen and said oxygen to produce an electric current.

6. The drilling system of claim 5, wherein the fuel is a component of the fluid flowing in the wellbore.

7. The drilling system of claim 5, wherein the fuel is injected into and flows with said fluid flowing in the wellbore.

8. The drilling system of claim 1, wherein the fuel cell is a proton exchange membrane fuel cell.

9. The drilling system of claim 1, further comprising a controller having a processor and a memory, said controller acting according to programmed instructions to control the operation of the fuel cell to power the electrical device.

10. The drilling system of claim 9, further comprising a sensor operatively coupled to said controller for providing a parameter of interest related to the operation of said fuel cell.

11. A method for powering a downhole device, comprising:
   a. extending a tubular member into a wellbore, said tubular member having a downhole assembly attached to a bottom end thereof;
   b. providing an electrical device on said downhole assembly;
   c. providing a fuel cell in said downhole assembly, said fuel cell being operatively coupled to said electrical device for powering said electrical device; and
   d. extracting with an extractor at least a portion of a fuel for said fuel cell from a fluid flowing in said wellbore.

12. The method of claim 11, further comprising extracting at least a portion of an oxidizer from said flowing fluid with the extractor.

13. The method of claim 11, wherein the electrical device is a motor driven pump.

14. The method of claim 11, wherein the electrical device is a motor disposed in the downhole assembly for driving the drill bit.

15. The method of claim 11, wherein the fuel cell comprises:
   i. a fuel source for supplying a hydrocarbon fuel;
   ii. a reformer for extracting hydrogen from said hydrocarbon fuel;
   iii. an oxidizer source for supplying oxygen; and
   iv. a reaction device for combining said hydrogen and said oxygen to produce an electric current.

16. The method of claim 15, wherein the fuel source is a component of the fluid flowing in the wellbore.

17. The method of claim 15, wherein the fuel source is injected into and flows with said fluid flowing in the wellbore.

18. The method of claim 15, wherein the fuel source is a hydrocarbon fluid produced from at least one formation proximate the wellbore.

19. The method of claim 11, wherein the fuel cell is a proton exchange membrane fuel cell.

20. The method of claim 11, further comprising providing a controller having a processor and a memory, said controller acting according to programmed instructions to control the operation of the fuel cell to power the electrical device.

21. The method of claim 20, further comprising providing at least one sensor operatively coupled to said controller for providing at least one parameter of interest related to the operation of said fuel cell.

22. The method of claim 11, further comprising:
   i. providing a fuel source for supplying a hydrocarbon fuel;
   ii. providing a reformer for extracting hydrogen from said hydrocarbon fuel;
   iii. providing an oxidizer source for supplying oxygen; and
   iv. providing a reaction device for combining said hydrogen and said oxygen to produce an electric current.

* * * * *